(12) United States Patent
Khan et al.

(10) Patent No.: US 9,344,537 B2
(45) Date of Patent: May 17, 2016

(54) GLOVE WITH USER-INTERACTABLE ELECTRONIC COMPONENTS

(71) Applicants: Naseem Karimbaksh Khan, Bridgeport, CT (US); Abdulhafiz Karimbaksh Khan, Jeddah (SA)

(72) Inventors: Naseem Karimbaksh Khan, Bridgeport, CT (US); Abdulhafiz Karimbaksh Khan, Jeddah (SA)

( * ) Notice: Subject to any disclaimer, the term of this patent is extended or adjusted under 35 U.S.C. 154(b) by 104 days.

(21) Appl. No.: 14/261,564

(22) Filed: Apr. 25, 2014

(65) Prior Publication Data

US 2015/0237181 A1    Aug. 20, 2015

Related U.S. Application Data

(60) Provisional application No. 61/942,299, filed on Feb. 20, 2014.

(51) Int. Cl.
*H04M 1/02* (2006.01)
*H04B 1/3827* (2015.01)

(52) U.S. Cl.
CPC ............ *H04M 1/0202* (2013.01); *H04B 1/385* (2013.01); *H04B 2001/3861* (2013.01); *Y10T 29/49005* (2015.01)

(58) Field of Classification Search
CPC ........... H04B 1/385; H04B 2001/3861; H04B 1/0202
See application file for complete search history.

(56) References Cited

U.S. PATENT DOCUMENTS

| 5,987,310 A | 11/1999 | Gray |
| 6,044,153 A | 3/2000 | Kaschke |
| 7,254,376 B2 | 8/2007 | Park et al. |
| 8,055,296 B1 | 11/2011 | Persson et al. |
| 8,190,749 B1 | 5/2012 | Chi et al. |
| 2004/0102931 A1* | 5/2004 | Ellis ............... A61B 5/1038 702/188 |
| 2005/0009584 A1* | 1/2005 | Park ................ H04B 1/385 455/575.6 |
| 2007/0220108 A1 | 9/2007 | Whitaker |
| 2009/0132309 A1* | 5/2009 | Marin ............ G06Q 10/0633 705/7.27 |
| 2011/0241976 A1* | 10/2011 | Boger ............ G02B 27/0172 345/8 |
| 2014/0194166 A1* | 7/2014 | Falck ............. A41D 19/0024 455/567 |

FOREIGN PATENT DOCUMENTS

CN          202536166 U       11/2012

OTHER PUBLICATIONS

Adnan Farooqui; "Hand-Tech Camera Glove Concept Puts a Camera in Your Palm"; Ubergizmo, Aug. 14, 2013; (2 pages).
Chris Davies; "DIY Glove Phone"; SlashGear; May 1, 2009; (8 pages).
"Wearable Cell Phone Concept"; Ubergizmo; Jul. 11, 2008 (2 pages).
GloriaSt; "Futuristic concept Handphone"; Future Technology; Jul. 25, 2012 (8 pages).
Ashley Norris, "02 unveils unique wearable phone built into shoes, bags and gloves"; Shiny Shiny; Sep. 19, 2013; (4 pages).

(Continued)

*Primary Examiner* — Lewis West
(74) *Attorney, Agent, or Firm* — Oblon, McClelland, Maier & Neustadt, L.L.P.

(57) ABSTRACT

A glove configured to be operational as or part of one or more of a phone and a camera. The glove is connectable to a mobile communication device; has a little finger receptacle with a microphone, an index finger receptacle with a camera and a thumb receptacle with a speaker; and is wearable on both a left hand and a right hand separately.

20 Claims, 9 Drawing Sheets

GLOVE TOP VIEW

(56) References Cited

OTHER PUBLICATIONS

"hi-Call Bluetooth Talking Glove"; hi-Fun; http://www.hi-fun.com/en/pagina/1548-hi-call-black-m; (4 pages).

Brian X. Chen; "Bluetooth Gloves Let You Talk to the Hand"; Wired.com; Nov. 4, 2008; (3 pages).

* cited by examiner

FIG 1 glove shape in layers

GLOVE SIDE VIEW

FIG 4

GLOVE SCREEN CHANGE

FIG 5

GLOVE TOP VIEW

FIG 6

Smart touch phone glove

GLOVE WITH USER-INTERACTABLE ELECTRONIC COMPONENTS

CROSS-REFERENCE TO RELATED APPLICATIONS

This application claims the benefit of U.S. Provisional Application No. 61/942,299, filed Feb. 20, 2014.

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

FIELD OF THE DISCLOSURE

The present disclosure is related to a wearable garment with at least one user-interactable electronic component. In particular, embodiments of the present disclosure are directed to a glove that is operational as one or more of a phone, and a camera. Embodiments of the present disclosure also provide user access to a user interface (e.g., display screen and/or operational input) of an electronic device.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Embodiments of the present disclosure can include a glove with user-interactable electronic components, comprising: a flexible body including a little finger receptacle, an index finger receptacle and a thumb receptacle; a first electronic device receptacle on a first side of the body, the first electronic device receptacle being configured to removably couple thereto an electronic device; a second electronic device receptacle on a second side of the body opposite the first side, the second electronic device receptacle being configured to removably couple thereto the electronic device; a microphone on the little finger receptacle; and a headphone on the thumb receptacle, wherein the glove is wearable on both a left hand and a right hand separately. Optionally, the glove can further comprise a camera portion on the index finger receptacle, the camera portion having: a camera lens mounted on the tip of the index finger receptacle, a camera flash mounted on the tip of the index finger receptacle, and a capture switch mounted on a side of the tip of the index finger receptacle facing toward the thumb receptacle and away from the little finger receptacle. Respective electrical connections may extend from the microphone, the headphone, and the camera portion, when present, to one or more of the first and second electronic device receptacles. Optionally, the flexible body is without ring and middle finger receptacles. Further, the flexible body, though flexible, is rigid enough such that the flexible body remains against a user's hand therein when the electronic device is connected to either of the first and second electronic device receptacles.

One or more embodiments can also include a wearable mobile communication system comprising: a mobile communication device; and a glove having a little finger receptacle, an index finger receptacle and a thumb receptacle and without ring and middle finger receptacles, the glove being wearable on both a left hand and a right hand separately. The glove can include a first electronic device receptacle on a first side of the glove, a second electronic device receptacle on a second side of the glove opposite the first side, a microphone mounted on a tip of the little finger receptacle, a headphone mounted on a tip of the thumb receptacle, and a camera portion mounted on a tip of the index finger receptacle. The camera portion may have a camera lens mounted on the tip of the index finger receptacle, a camera flash mounted on the tip of the index finger receptacle, a capture switch mounted on a side of the tip of the index finger receptacle facing toward the thumb receptacle and away from the little finger receptacle. The mobile communication device may be arranged in one of the first or second electronic device receptacles and is electrically connected to the microphone, the headphone and the camera portion via respective wiring portions. The glove may be made of material including silicon, leather, fabric, any combined material, or combination of any of the foregoing. Optionally, a user's middle finger and ring finger are not covered by the glove. In one or more embodiments, optionally, the glove may further comprise a transparent or opaque cover fixedly coupled adjacent to one or more of the first and second electronic device receptacles, each of the one or more covers being configured to cover the mobile communication device when the mobile communication device is arranged in a corresponding one of the first and second electronic device receptacles.

Further, optionally, one or both of the first and second electronic receptacles are configured to accommodate therein two opposing sides of the mobile communication device. Optionally, a mobile electronic device may be provided, where the mobile communication device can be removably coupled in one of the first or second electronic device receptacles, and the mobile electronic device can be removably coupled in the other one of the first or second electronic device receptacles.

Optionally, the mobile communication device is a square-shaped phone (e.g., a smart phone) arranged or mounted in one of the first and second electronic receptacles of the glove. Connector circuitry configured to connect the glove to one or more devices other than the mobile communication device or the mobile electronic device may be provided, such as circuitry connectable to a utility or grid to charge the mobile communication device or the mobile electronic. A displayable surface of the mobile communication device and/or the mobile electronic device, when arranged in one of the first or second electronic device receptacles may be substantially flush or flush with a body portion of the glove. Optionally, the mobile communication device is rotatably coupled, separately, to each of the first and second electronic device receptacles such that two opposing sides of the mobile communication device are exposed. The mobile communication device optionally may be flexible so as to conform generally to the palm or backside of the user's hand depending upon orientation of the glove in which one of the first and second electronic device receptacles in which the mobile communication device is arranged.

Optionally, the system inclusive or exclusive of a mobile communication device and/or a mobile electronic device (i.e., within the glove itself) may be circuitry configured to enable a user talk on the phone, for instance, when the thumb receptacle is positioned adjacent the user's ear, and the little finger receptacle is positioned adjacent the user's mouth. The system may optionally include circuitry configured to let a user capture images and videos of a scene by pointing the user's index finger with the camera (or video capture/recorder) toward the scene.

Embodiments of the present disclosure may also include a method comprising: providing a glove with user-interactable electronic components, the glove including: a flexible body including a little finger receptacle, an index finger receptacle and a thumb receptacle, a first electronic device receptacle on a first side of the body, the first electronic device receptacle being configured to removably couple thereto an electronic device, a second electronic device receptacle on a second side of the body opposite the first side, the second electronic device receptacle being configured to removably couple thereto the electronic device, and a camera portion on the index finger receptacle, the camera portion having a camera lens mounted on the tip of the index finger receptacle, a camera light mounted on the tip of the index finger receptacle, and a capture switch mounted on a side of the tip of the index finger receptacle facing toward the thumb receptacle and away from the little finger receptacle, wherein the glove is wearable on both a left hand and a right hand separately. Optionally or alternatively to the camera portion, the glove may further include a microphone on the little finger receptacle, and a headphone on the thumb receptacle, and the method may further comprise electrically connecting the electronic device to one of the first or second electronic device receptacles such that the electronic device is operative with one or more of the camera portion, the microphone and the headphone.

Embodiments of the present disclosure also include a smart glove upon which a square shaped smart phone may be mounted. A microphone may be mounted on the tip of little finger on the smart glove, a camera lens may be mounted on the tip of index finger on the smart glove, a flash light may be mounted above the camera lens, a capture switch may be mounted on the closest joint to the tip of index finger, and a headphone may be mounted on the thumb of the smart glove.

The smart phone may be provided in the glove at the back of the hand so as to let the smart phone be flipped or rotated about an axis to either a screen side of smart phone or a back side of the smart phone on which a back lens of the smart phone camera may be provided. Optionally, the middle finger and ring finger are not covered by the glove. The glove may be made of material including but not limited to silicon, leather, fabric or any combined material. Additionally, the smart glove has the capability to be used on both left and right hands, letting a user talk on the phone by inserting her thumb inside ear, and inserting her little finger in front of her mouth and furthermore letting the user capture image and video of a scene by pointing her index finger toward the scene.

BRIEF DESCRIPTION OF THE DRAWINGS

The accompanying drawings, which are incorporated in and constitute part of the specification, illustrate one or more embodiments and, together with the description, explain these embodiments. The accompanying drawings have not necessarily been drawn to scale. Any values dimensions illustrated in any accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the invention and is not necessarily intended to represent the only embodiments in which the invention may be practiced. In certain instances, the description includes specific details for the purpose of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, it is intended that the present invention and embodiments thereof cover the modifications and variations. For example, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit the present invention to any particular orientation or configuration. Furthermore, terms such as "first," "second," "third," etc., merely identify one of a number of portions, components and/or points of reference as disclosed herein, and likewise do not necessarily limit the present invention to any particular configuration or orientation.

Embodiments of the present disclosure include a wearable garment with at least one user-interactable electronic component. In particular, embodiments of the present disclosure are directed to a glove that is operational as one or more of a phone and a camera. The glove can provide user access to a user interface of one or more electronic components a display screen and/or operational input of a telephone (e.g., smart phone). The present disclosure may eliminate or reduce unauthorized use of a mobile electronic device coupled to the glove, since the mobile electronic device is coupled to the user's hand via the glove. Further, password protection may be unnecessary when the mobile electronic device is coupled to the glove.

According to certain non-limiting embodiments of the present disclosure, a wearable mobile communication apparatus may be in the form of a glove and may include a microphone mounted on a tip or end of a little finger of the glove, a camera lens mounted on a tip or end of an index finger of the glove, a light (e.g., a camera flash or video camera light) mounted above the camera lens, a capture switch mounted on a closest joint to the tip or end of the index finger of the glove, and a headphone mounted on a tip or end of a thumb of the glove. The aforementioned positioning of the components is not intended to be limiting.

Optionally, the middle finger and ring finger are not covered by the glove, e.g., to provide dexterity uncovered fingers may provide and/or to allow a user to operate a touch screen responsive to a user's fingers rather than a covered finger). The material from which the glove is made of may include silicon, leather, fabric or any combined material. Further, the material may be waterproof or water-resistant. Optionally, the material may be a breathable material.

The wearable smart glove device is configured to provide the capability for wearing on both left and right hands and can include circuitry configured to let a user talk on the phone by inserting the thumb adjacent or inside the ear, and inserting the little finger in front of or adjacent a user's mouth. Circuitry may also be provided to let a user capture images and/or videos of a scene by pointing the user's index finger with the camera toward the scene. Connector circuitry may be provided in or on the glove to connect the glove to other devices using connector leads, such as an electrical charging source, a removable memory unit, and a wirelessly connectable electric device. Thus, the glove may also be wirelessly connected to other electric devices.

In one embodiment of the present disclosure, the smartphone has a square shape and fits dimensions of the back of the hand of a user. In one embodiment, the present disclosure provides a smart phone of flexible shape with Nano Silicon technology, for instance, which may fit to the curve of user's hand. In another non-limiting embodiment, the smart glove of the present disclosure provides a water proof microphone and speaker system, built-into the glove on the tips of fingers. In another non-limiting embodiment the present disclosure provides a camera and flash system (or light system in the case of a video camera), also built into a finger tip, allowing capture of photographs and/or video. In another non-limiting embodiment, the present disclosure provides a double-sided glove with options for right or left hand. In another non-limiting embodiment according to the present disclosure, the phone may be removed from the glove for charging and may also be used as a conventional cell phone (i.e., without the glove). In another non-limiting embodiment the smart glove of the present disclosure is Bluetooth enabled with a head speaker. In another non-limiting embodiment the smart glove of the present disclosure the camera, microphone and speaker on the glove are connected to the smart phone by connecting leads inside the glove. In other non-limiting embodiments of the present disclosure, the camera may either be a fully functional camera, or it may be used to capture images, and transmit them to the smartphone, either wirelessly or in a wired manner, for image processing to be performed by the smartphone. In another non-limiting embodiment of the present disclosure the glove may be made of silicon, leather, fabric, any combined material, or combination thereof. In another non-limiting embodiment the present disclosure the glove may eliminate or reduce electronic device damage due to improper transportation, for example, in a pants pocket with keys or anything metallic. In another non-limiting embodiment the phone in the present disclosure may have a be a smart phone of square shape featuring a 6 cm by 6 cm touch screen, for instance. In another embodiment the present disclosure a double-sided glove is provided, with options for the right or left hand. In one embodiment of the present disclosure the smart phone attaches to the glove by use of a clear pocket. In another non-limiting embodiment the smart glove of the present disclosure has phone receptacles on both sides. In another non-limiting embodiment of the present disclosure, the smartphone may be used as the camera switch. In another non-limiting embodiment of the present disclosure, the camera may take videos, in which case a microphone may be provided on the tip of the index finger of the glove, for instance, adjacent the camera. In another non-limiting embodiment the smart glove of the present disclosure may include one or more blood pressure sensors, for instance, at one or more finger tips of the glove, and thus may be configured to measure the blood pressure of a person wearing the glove, for instance. Blood pressure may be calculated using internal processing circuitry of the glove and/or using a mobile electronic device coupled to the glove, such as a cellular telephone, tablet or PDA.

Referring now to FIGS. 1-7, these figures illustrate a non-limiting example of a wearable garment system 100 with at least one user-interactable and/or user-viewable electronic component according to one or more embodiments of the present disclosure.

Figure 3:
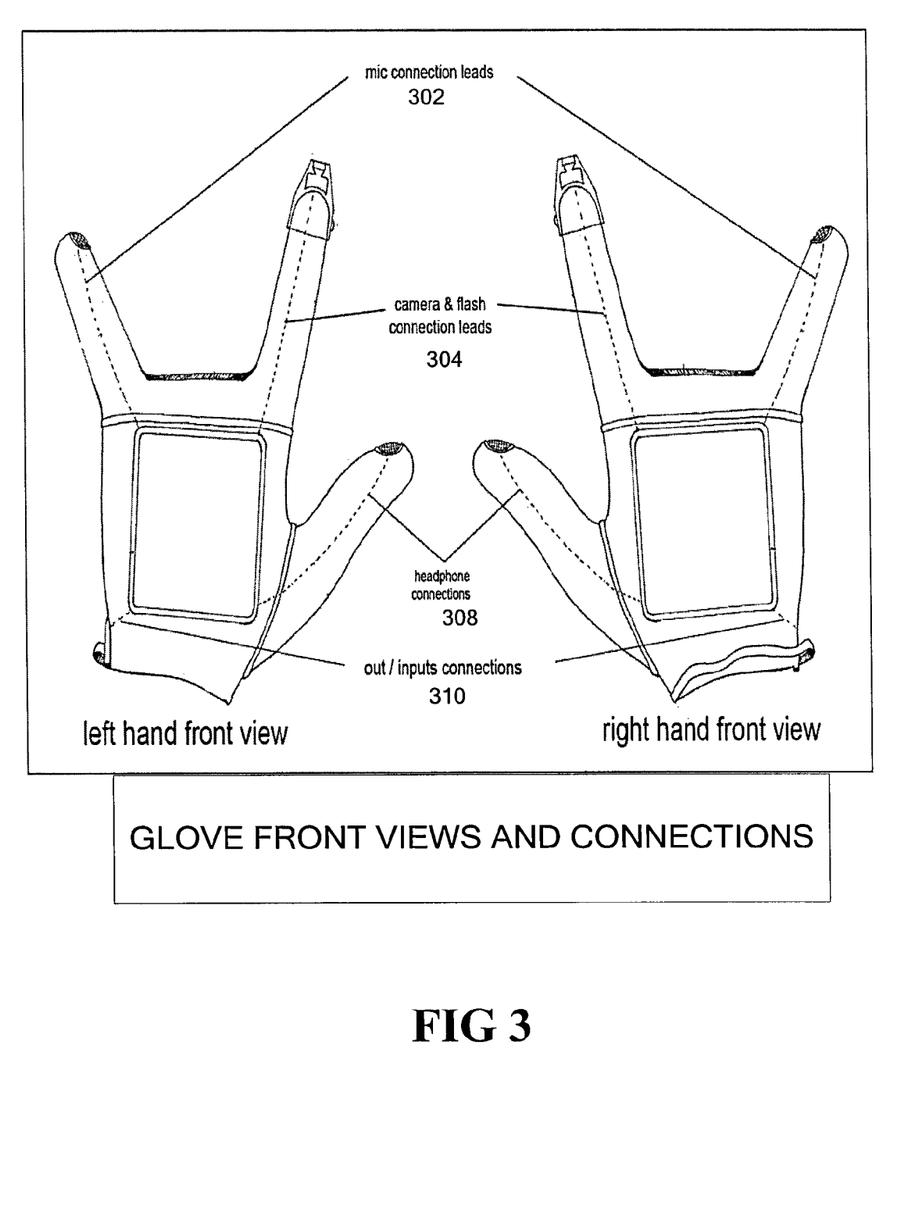
FIG. 3 provides illustrations of left-handed and right-handed view of a glove front views and connections, according to an embodiment of the present disclosure.
Figure 4:
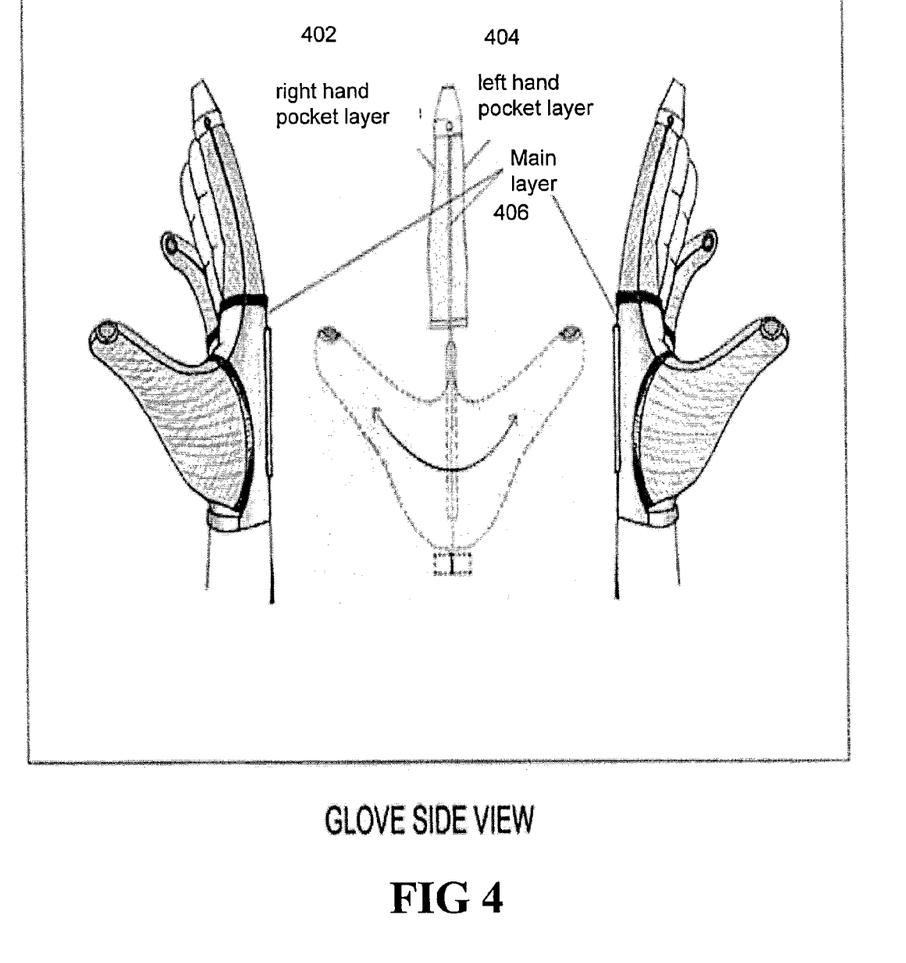
FIG. 4 is illustrates left-handed and right-handed side views of a glove, according to an embodiment of the present disclosure.

System 100 can be in the form of a glove or partial-glove having a little finger receptacle, an index finger receptacle and a thumb receptacle, for instance. In the case of a partial-glove, receptacles for one or more of the ring and middle fingers may be omitted. Other portions of the glove may be omitted, such as a palm portion of the glove (see, e.g., FIG. 7). As will be discussed in more detail below with respect to FIGS. 3 and 4, the glove may be wearable on a left hand, on a right hand or on both left and right hands separately. FIGS. 3 and 4 are illustrative of this aspect. For instance, FIG. 4 illustrates as an example that the glove may comprise a main layer 406, a right hand pocket layer 402 (on which an electronic device receptacle may be provide), and a left hand pocket layer 404 (on which an electronic device receptacle may be provide).

Figure 1:
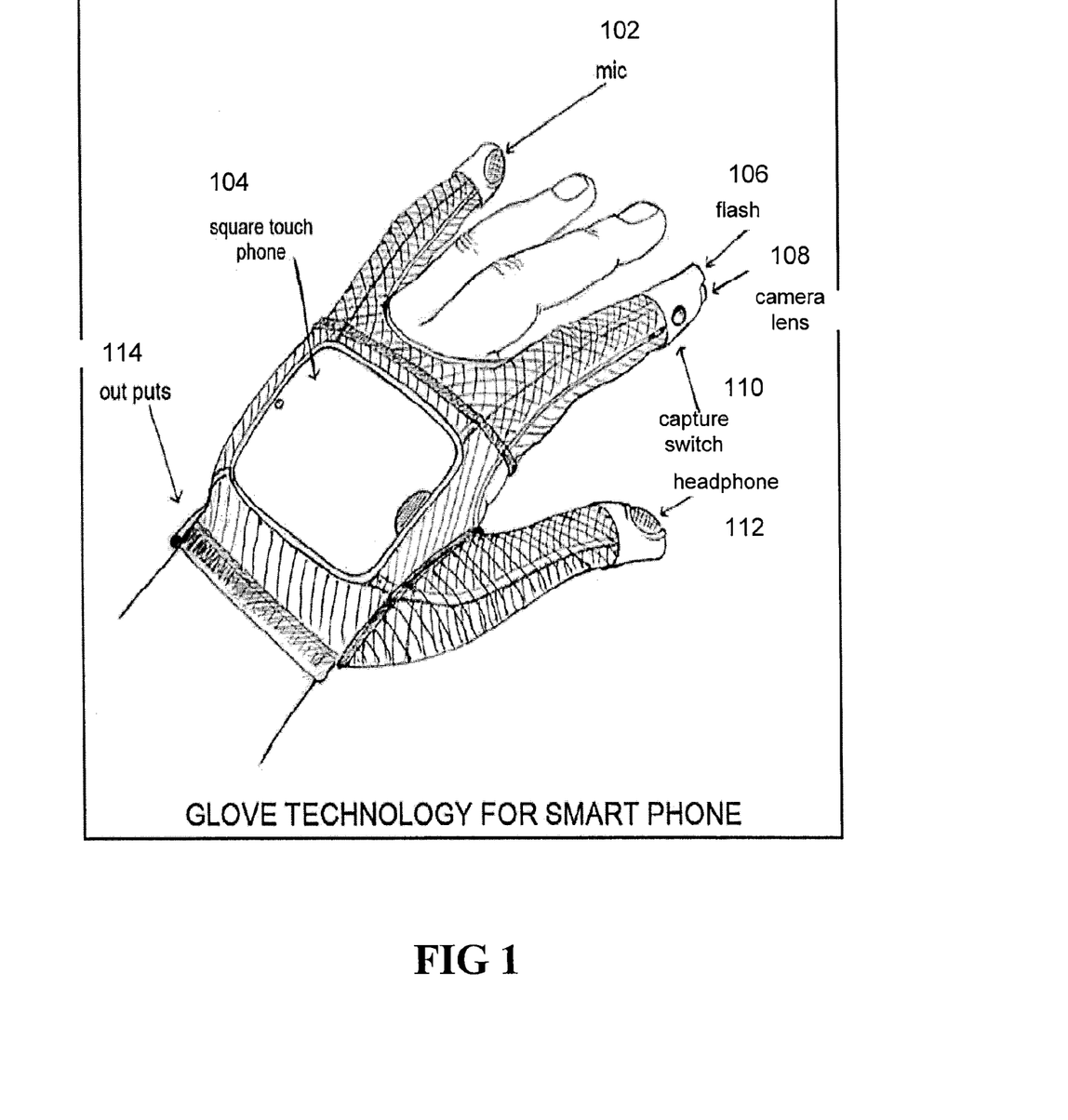
FIG. 1 is a simplified illustration of a system according to an embodiment of the present disclosure.
Figure 2:
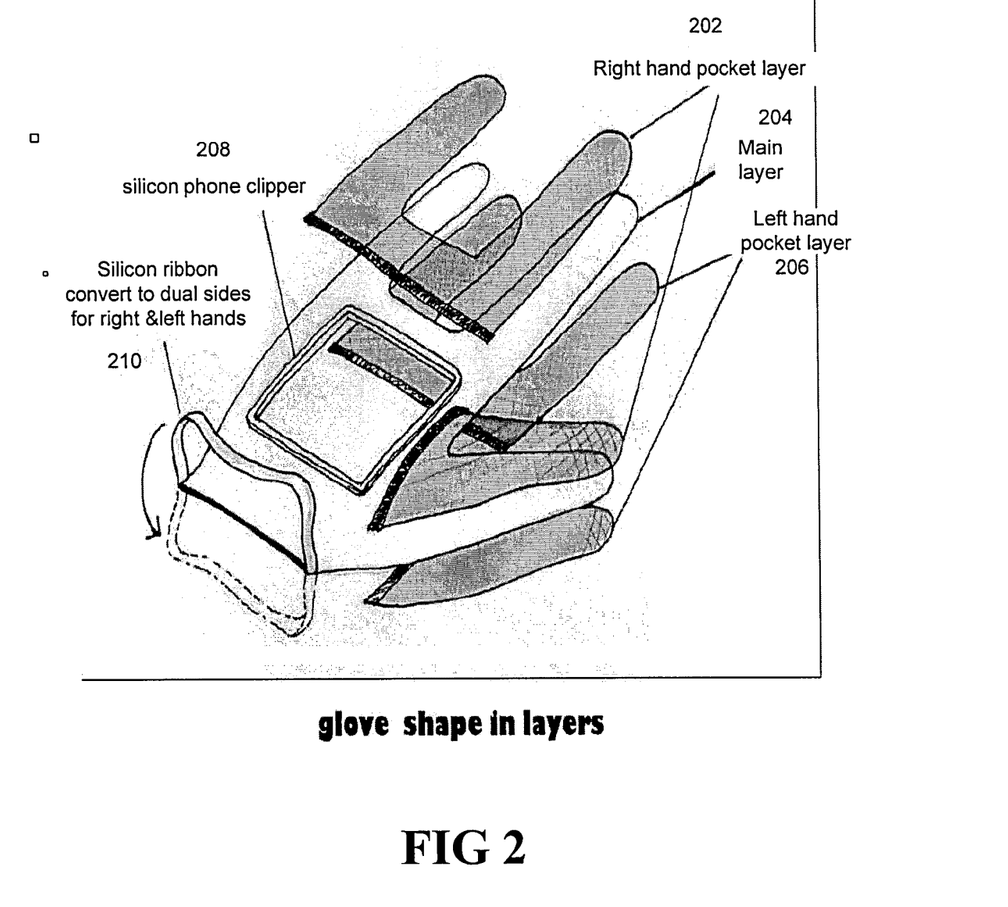
FIG. 2 is an illustration of an exemplary glove shape, illustrated in layers, according to an embodiment of the present disclosure.
Figure 6:
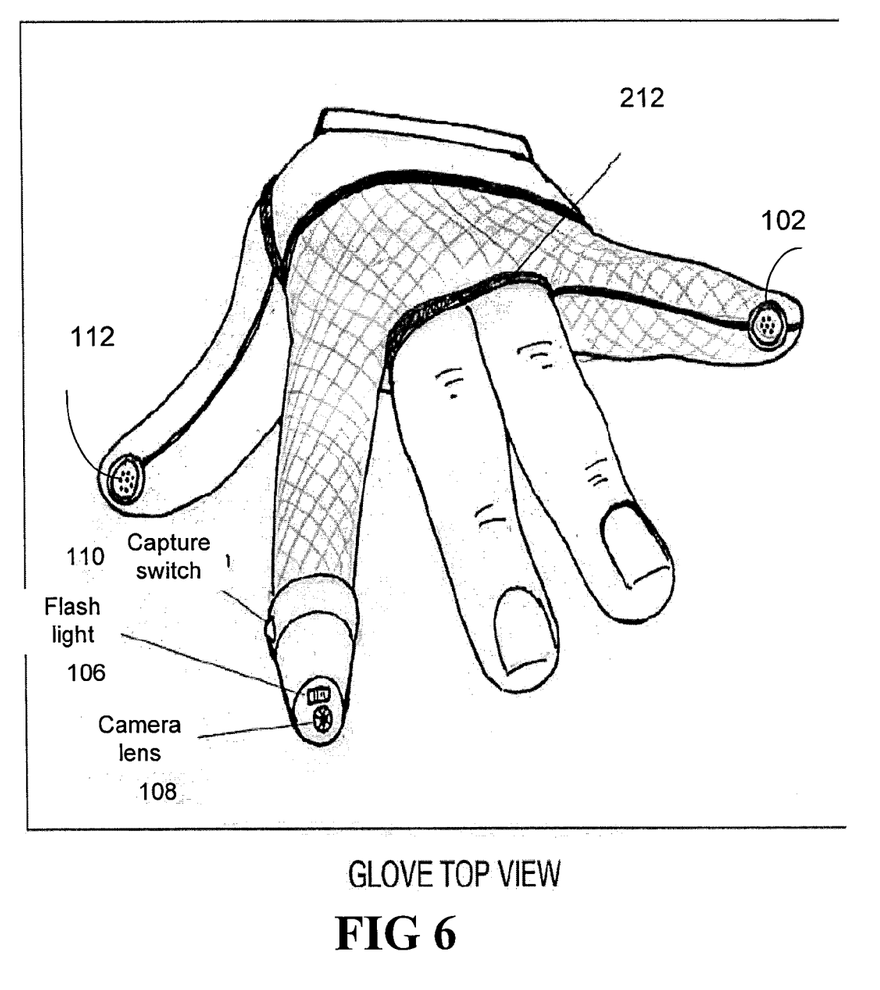
FIG. 6 shows a top view of a glove, according to an embodiment of the present disclosure.

The glove may be made of material or materials including silicon, leather, fabric, any combined wearable material, or combination of any of the foregoing. Further, as illustrated in FIGS. 2 and 6, for instance, in embodiments of the present disclosure, the glove may be comprised of multiple layers and/or multiple segments connected together to form the glove. For instance, layers and segments of the glove can include a right hand pocket layer 202, a main layer 204 and a left hand pocket layer 206. A ribbon 210, such as a silicon ribbon, may also be provided to keep the glove opening tight against the user's wrist. As indicated in FIG. 6, another ribbon 608 may be provided around where a user's middle and ring fingers extend from the glove. The different layers may provide insulation between electrical connections (e.g., wiring) and the user's hand when the glove is on the user's hand. Additionally, the glove may be a flexible body, however, though flexible, may be rigid enough such that the flexible body remains against a user's hand therein when a mobile electronic device is connected to an electronic device receptacle therein.

The glove can also include one or more receptacles to hold or couple to the glove a corresponding mobile electronic device. Optionally, one or more of the receptacles is configured to allow the mobile electronic device to be physically and/or electrically coupled to the glove. For instance, FIG. 2 illustrates an electronic device receptacle 208 configured to have removably coupled thereto a mobile electronic device 104, such as a cellular phone (e.g., smart phone with touchscreen) or miniaturized tablet device. Electronic device receptacle 208 can be of any suitable form, such as silicon phone clipper, a pocket, a snap-fit receptacle, a release-by-flexing receptacle, etc. Further, electronic device receptacle 208 may have one or more electrical connections connected to microphone 102, camera portion 106/108/110, headphone 112, and output receptacle 114 via respective connectors (e.g., wiring, wireless) 302, 304, 308, 310 as illustrated in FIG. 3, for instance. Incidentally, the mobile device 104 may be flexible so as to conform generally to the palm or backside of the user's hand depending upon the orientation of the glove.

As alluded to above, the glove may have two electronic device receptacles 208, one on each side of the glove. The two electronic device receptacles may be the same or different. Thus, two mobile electronic devices that are the same or different may be simultaneously coupled to the glove, albeit on different sides. As such, as user, when wearing the glove with two mobile electronic devices may access a mobile electronic device coupled to the glove at the back of his or her hand and also access at the same time or immediately subsequent thereto another mobile electronic device in the palm of the glove.

Additionally, each receptacle 208 can include at least one electrical connection portion, such as a jack, USB connection, etc. for electrical connection to mobile electronic device 104 when the mobile electronic device 104 is properly coupled to the receptacle 208. Thus, when the mobile electronic device 104 is properly coupled to the receptacle, the mobile electronic device 104 can be electrically connected to the microphone 102, the headphone 112, the camera portion 106/108/110, and output receptacle 114 via respective connectors (e.g., wiring, wireless) 302, 304, 308, 310 as illustrated in FIG. 3, for instance. Optionally, when properly coupled to receptacle 208, mobile electronic device 104 may be substantially flush or flush with a body portion of the glove, such as illustrated in FIG. 4.

Figure 5:
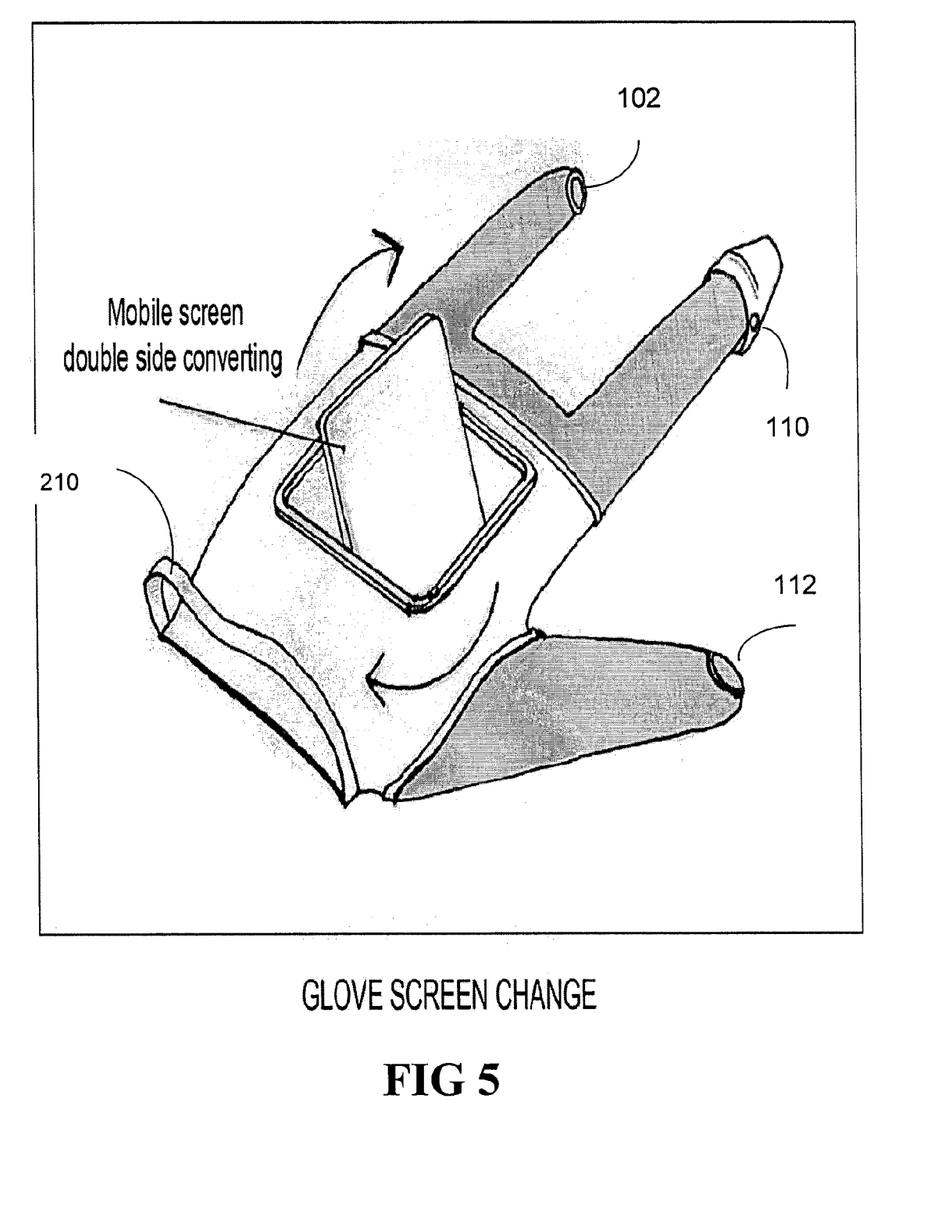
FIG. 5 illustrates an example of a mobile electronic device being repositional to different orientations to a glove, according to an embodiment of the present disclosure.

Optionally, each receptacle 208 is configured to accommodate therein two opposing sides of a mobile device. For instance, opposing faces of a cellular phone (e.g., display screen face and opposing camera aperture face) may be accommodated by receptacle 208. FIG. 5, for instance, illustrates an example whereby a mobile electronic device is rotatably coupled, e.g., along an axis set by opposing pins or notches in the receptacle 208. In such as case, optionally, the glove material may be stretched from a user's hand (when the glove is on the user's hand) so the mobile electronic device can be rotated to the other side. Of course, the mobile electronic device may be rotated or otherwise reversed when the glove is off.

Output receptacle 114 can be provided to connect the glove to one or more devices other than the mobile electronic device. For instance, output receptacle 114 may be connectable to a memory device to upload and/or download data from the mobile electronic device 104 and/or directly from camera portion 106/108/110. Output receptacle 114 also may be connectable to a source of electricity, such as a battery source or mains to charge the mobile electronic device 104 (or devices 104 in a case where two devices are implemented).

Camera portion 106/108/110 can include a camera lens 108, a light 106 (e.g., a camera flash), and a capture switch 110. Further, camera portion 106/108/110 may be arranged no the index finger receptacle as illustrated in the figures, for instance. In particular, the camera lens 108 may be mounted on or affixed to a tip or end of the index finger receptacle, light 106 may also be mounted on the tip or end of the index finger receptacle, and capture switch 110 may be mounted on a side of the index finger receptacle, for example, on a side of the tip or end facing toward the thumb receptacle and away from the little finger receptacle. Optionally, the camera portion may be operative as a video recorder. Mobile electronic device 104 may be operative to control the camera.

Figure 7:
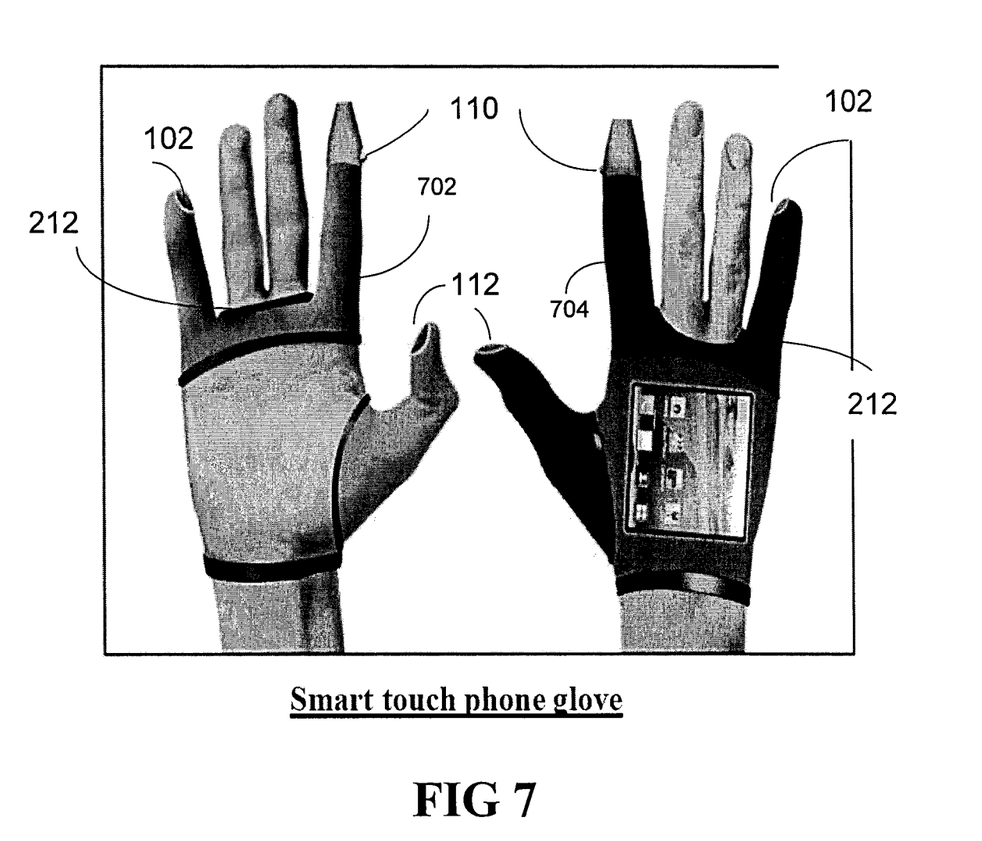
FIG. 7 illustrates an embodiment of a glove according to the present disclosure, whereby only one side of the glove includes a receptacle for a mobile electronic device.

Referring now to FIG. 7, FIG. 7 is a non-limiting example of how a glove according to one or more embodiments looks when on a user's hand. FIG. 7 shows a view 702 of how the glove may look from the palm of the user's hand and a view 704 of how the glove may look from the back of the user's hand.

Figure 8:
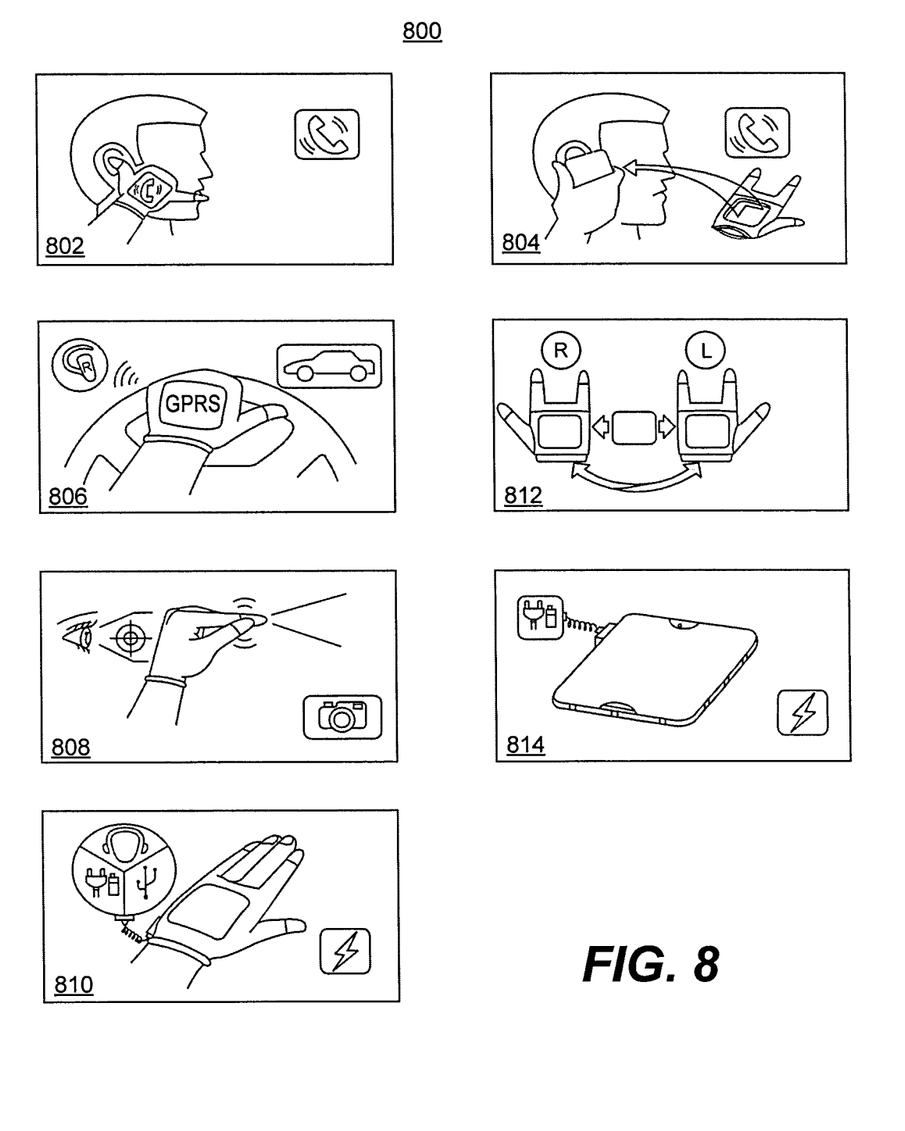
FIG. 8 illustrates examples of operational aspects and settings of a glove, according to an embodiment of the present disclosure.

Referring now to FIG. 8, FIG. 8 provides non-limiting examples of uses and/or functionality of a system (or portions thereof) according to one or more embodiments of the present disclosure.

Subfigure 802 of FIG. 8 shows an example of a user may utilizing the glove for phone conversations. Alternatively, the user may enact a speaker phone function of the phone and/or glove, whereby the user does not necessarily have to place his hand and thus the glove in the location and arrangement illustrated in 802. For instance, the user may simply position the glove directly in front of his or her face.

Subfigure 804 shows an example of how the mobile electronic device (e.g., a phone) may be removed from the glove and used separately from the glove. Though not expressly indicated, the mobile electronic device may be removed from the glove, but still remain operational with the glove. For instance, a user wearing the glove may participate in a phone call using the speaker and microphone of the glove and another user having a telephone removed from the glove may also participate in the phone call. As another example, a user with the glove may aim the camera, and a user of the mobile electronic device removed from the glove may operate the functionality of the camera (e.g., take a picture or record video) using the mobile electronic device removed from the glove.

Subfigure 806 shows an example of how a user may utilize the smart glove for navigation and positioning while the user is driving.

Subfigure 808 shows an example of how a user may take pictures of a scene by pointing the index finger of the glove and thus the camera toward the scene. Depending upon the particular arrangement of the camera, such as the location of the capture switch (which may also be a record button in the case of a video camera), other hand arrangements may be made to take a picture or record a video.

Subfigure 810 shows an example of how a output connector or output connectors on the glove may be connected to other peripherals, such as headphones, USB, or a electricity charging source. Not expressly illustrated, an output connector of the glove may be connected to a removable memory device. Thus, the mobile electronic device and/or glove circuitry, such as the speaker, may be electronically connected to corresponding peripherals. For instance, data may be transferred from the removable memory device to the mobile electronic device, and data may be transferred to the removable memory device from the mobile electronic device and/or the camera portion of the glove. As another example, the mobile electronic device may be charged when the output connector of the glove is connected to a charging source via a cable or wire.

Subfigure 812 shows an example of how left and right hand glove orientations can present the mobile electronic device at mirror image positions.

Subfigure 814 shows an example of how the mobile electronic device may be removed from the glove and separately connected to an electricity charging source or sources.

Next, a hardware description of a device or system 900 according to one or more exemplary embodiments is described with reference to FIG. 9.

Figure 9:
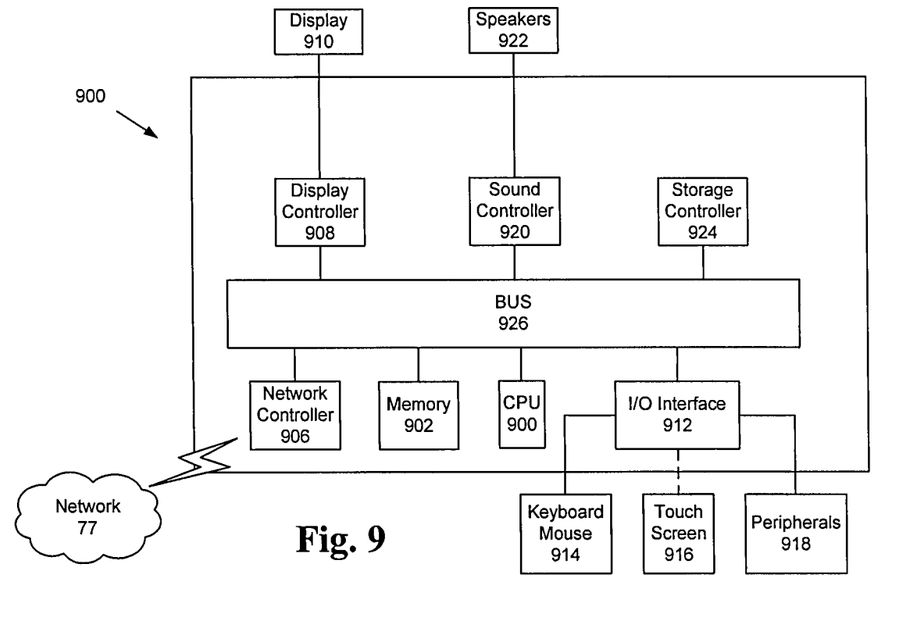
FIG. 9 is a block diagram of a system according to an embodiment of the present disclosure.

In FIG. 9, the device or system 900 may include a CPU or processing circuitry which performs the processes described above. The CPU/processing circuitry may be in the mobile electronic device entirely, in the glove entirely, or distributed between the glove and mobile electronic device. The process data and instructions may be stored in memory 902. The CPU may be a Xenon or Core processor from Intel of America or an Opteron processor from AMD of America, or may be other processor types that would be recognized by one of ordinary skill in the art. Alternatively, the CPU may be implemented on an FPGA, ASIC, PLD or using discrete logic circuits, as one of ordinary skill in the art would recognize. Further, CPU may be implemented as multiple processors cooperatively working in parallel to perform the instructions of the inventive processes described above.

The device or system 900 in FIG. 9 also includes a network controller 906, such as an Intel Ethernet PRO network interface card from Intel Corporation of America, for interfacing with network 77. Further, as can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The device or system 900 may further include a display controller 908, such as a NVIDIA GeForce GTX or Quadro graphics adaptor from NVIDIA Corporation of America for interfacing with display 910, such as a Hewlett Packard HPL2445w LCD monitor.

A general purpose I/O interface 912 may interface with a touch screen panel 916 on or separate from display 910.

I/O interface may connect to one or more peripherals 718 including the camera portion of the glove and other peripherals as discussed herein via interface 114.

A sound controller 920 may be also provided in the device or system, such as Sound Blaster X-Fi Titanium from Creative, to interface with speakers/microphone 922 (which may be representative of the headphone 112 and microphone 102 of the glove) thereby providing sounds and/or music and functionality associated with a telephone, of course.

Generally speaking, the CPU (i.e., processor)/processing circuitry of the device and/or system 900 may operate and function as described herein. For example, the CPU/processing circuitry may function and operate as a phone with a headphone 112, a microphone 102, and a mobile electronic device 104. Optionally or alternatively, the CPU/processing circuitry may function and operate as a camera with a camera portion 106/108/110 and a mobile electronic device 104.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A wearable mobile communication system comprising:
a mobile communication device; and
a glove having a little finger receptacle, an index finger receptacle and a thumb receptacle and without ring and middle finger receptacles, the glove being wearable on both a left hand and a right hand separately, and the glove including:
a first electronic device receptacle on a first side of the glove,
a second electronic device receptacle on a second side of the glove opposite the first side,
a microphone mounted on a tip of the little finger receptacle,
a headphone mounted on a tip of the thumb receptacle, and
a camera portion mounted on a tip of the index finger receptacle, the camera portion having:
a camera lens mounted on the tip of the index finger receptacle,
a camera flash mounted on the tip of the index finger receptacle,
a capture switch mounted on a side of the tip of the index finger receptacle facing toward the thumb receptacle and away from the little finger receptacle,
wherein the mobile communication device is arranged in one of the first or second electronic device receptacles and is electrically connected to the microphone, the headphone and the camera portion via respective wiring portions.

2. The system of claim 1, wherein the mobile communication device is a square-shaped smart phone arranged in said one of the first and second electronic receptacles of the glove.

3. The system of claim 1, wherein both the first and second electronic receptacles are configured to accommodate therein two opposing sides of the mobile communication device.

4. The system of claim 3, wherein a user's middle finger and ring finger are not covered by the glove.

5. The system of claim 1, wherein the glove is made of material including silicon, leather, fabric, any combined material, or combination of any of the foregoing.

6. The system of claim 1, further comprising a mobile electronic device, the mobile communication device being removably coupled in said one of the first or second electronic device receptacles, and the mobile electronic device being removably coupled in the other one of the first or second electronic device receptacles.

7. The system of claim 1, wherein the mobile communication device is a phone, and the system further comprising circuitry configured to enable a user talk on the phone when the thumb receptacle is positioned adjacent the user's ear, and the little finger receptacle is positioned adjacent the user's mouth.

8. The system of claim 1, further comprising circuitry configured to let a user capture images and videos of a scene by pointing the user's index finger toward the scene.

9. The system of claim 1, further comprising connector circuitry configured to connect the glove to one or more devices other than the mobile electronic device.

10. The system of claim 1, wherein a displayable surface of the mobile communication device when the mobile communication device is arranged in one of the first or second electronic device receptacles is substantially flush or flush with a body portion of the glove.

11. The system of claim 1, wherein the mobile communication device is rotatably coupled, separately, to each of the first and second electronic device receptacles such that two opposing sides of the mobile communication device are exposed.

12. The system of claim 1, wherein the glove further comprises a transparent or opaque cover fixedly coupled adjacent to one or more of the first and second electronic device receptacles, each of the one or more covers being configured to cover the mobile communication device when the mobile communication device is arranged in a corresponding one of the first and second electronic device receptacles.

13. The system of claim 1, wherein the mobile communication device is flexible so as to conform generally to the palm or backside of the user's hand depending upon orientation of the glove in which one of the first and second electronic device receptacles in which the mobile communication device is arranged.

14. A glove with user-interactable electronic components, comprising:
    a flexible body including a little finger receptacle, an index finger receptacle and a thumb receptacle;
    a first electronic device receptacle on a first side of the body, the first electronic device receptacle being configured to removably couple thereto an electronic device;
    a second electronic device receptacle on a second side of the body opposite the first side, the second electronic device receptacle being configured to removably couple thereto the electronic device;
    a microphone on the little finger receptacle;
    a headphone on the thumb receptacle; and
    a camera portion on the index finger receptacle, the camera portion having:
        a camera lens mounted on the tip of the index finger receptacle, and
        a camera flash mounted on the tip of the index finger receptacle,
    wherein the glove is wearable on both a left hand and a right hand separately.

15. The glove according to claim 14, wherein the camera portion further includes
    a capture switch mounted on a side of the tip of the index finger receptacle facing toward the thumb receptacle and away from the little finger receptacle.

16. The glove according to claim 15, wherein respective electrical connections extend from the microphone, the headphone, and the camera portion to one or more of the first and second electronic device receptacles.

17. The glove according to claim 14, wherein the flexible body is without ring and middle finger receptacles.

18. The glove according to claim 14, wherein the flexible body, though flexible, is rigid such that the flexible body remains against a user's hand therein when the electronic device is removably connected to either of the first and second electronic device receptacles.

19. A method comprising:
    providing a glove with user-interactable electronic components, the glove including:
        a flexible body including a little finger receptacle, an index finger receptacle and a thumb receptacle,
        a first electronic device receptacle on a first side of the body, the first electronic device receptacle being configured to removably couple thereto an electronic device,
        a second electronic device receptacle on a second side of the body opposite the first side, the second electronic device receptacle being configured to removably couple thereto the electronic device, and
        a camera portion on the index finger receptacle, the camera portion having a camera lens mounted on the tip of the index finger receptacle, a camera light mounted on the tip of the index finger receptacle, and a capture switch mounted on a side of the tip of the index finger receptacle facing toward the thumb receptacle and away from the little finger receptacle,
    wherein the glove is wearable on both a left hand and a right hand separately.

20. The method according to claim 19,
    wherein the glove further includes:
        a microphone on the little finger receptacle, and
        a headphone on the thumb receptacle, and
    wherein the method further comprises:
    electrically connecting the electronic device to one of the first or second electronic device receptacles such that the electronic device is operative with one or more of the camera portion, the microphone and the headphone.

* * * * *